United States Patent
Gohda et al.

(10) Patent No.: US 9,483,575 B2
(45) Date of Patent: **\*Nov. 1, 2016**

(54) REPRODUCING A GRAPHICAL USER INTERFACE DISPLAY

(75) Inventors: Hidenori Gohda, Osaka (JP); Masahiko Kosuda, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1113 days.

This patent is subject to a terminal disclaimer.

(21) Appl. No.: 13/426,989

(22) Filed: Mar. 22, 2012

(65) Prior Publication Data

US 2012/0197983 A1    Aug. 2, 2012

Related U.S. Application Data

(63) Continuation of application No. 13/151,068, filed on Jun. 1, 2011.

(30) Foreign Application Priority Data

Jun. 4, 2010    (JP) .................................. 2010-129262

(51) Int. Cl.
   *G06F 15/16*    (2006.01)
   *G06F 17/30*    (2006.01)
   *H04L 29/08*    (2006.01)

(52) U.S. Cl.
   CPC ......... *G06F 17/30902* (2013.01); *H04L 67/02* (2013.01); *H04L 67/2842* (2013.01); *H04L 67/36* (2013.01)

(58) Field of Classification Search
   CPC ...................... G06F 17/30902; H04L 67/2842
   USPC ................................................. 709/203, 245
   See application file for complete search history.

(56) References Cited

U.S. PATENT DOCUMENTS

2005/0122997 A1    6/2005  Bendelac et al.
2008/0228772 A1\*  9/2008  Plamondon ..................... 707/10
2009/0044108 A1    2/2009  Shin et al.

FOREIGN PATENT DOCUMENTS

JP    1993-173739    7/1993
JP    2002-026976    1/2002

(Continued)

OTHER PUBLICATIONS

Nakamura Tomohiro et al, Implementation and Evaluation of Help-Desk Support System, IEICE Technical Reports, Japan,The Institute of Electronics, Information and Communication Engineers Information,109(450), 1-6, Feb. 25, 2010; English Abstract Only.

(Continued)

*Primary Examiner* — Derrick Ferris
*Assistant Examiner* — Farhad Ali
(74) *Attorney, Agent, or Firm* — Steven L. Nichols; Fabian VanCott

(57) ABSTRACT

A method for reproducing a graphical user interface display includes, with a graphical user interface display reproduction system, extracting data from network traffic being sent from a server to a first client device, the network traffic including cacheable files used to create a graphical user interface display on the first client device, storing the cacheable file in a trace file associated with the first client device, and sending the cacheable file to a second client device in response to a request from the second client device.

20 Claims, 14 Drawing Sheets

(56) References Cited

FOREIGN PATENT DOCUMENTS

| | | |
|---|---|---|
| JP | 2004-102951 | 4/2004 |
| JP | 2006-092569 | 4/2006 |
| JP | 2008-071092 | 3/2008 |
| JP | 2008-108047 | 5/2008 |
| JP | 2009-507454 | 2/2009 |
| JP | 2009-098897 | 5/2009 |
| JP | 2009-301084 | 12/2009 |
| JP | 2010-224861 | 10/2010 |

OTHER PUBLICATIONS

Nakamura, et al.; "Implementation and Evaluation of Help Desk Support System"; Life Intelligence and Office Information Systems; The Institute of Electronics, Information Implementation Engineers Technical Report; Mar. 2010; vol. 109 No. 450. (Note: Both NPL documents as reflected in the Common Citation Document 5 IP offices website cited in the related JP Application No. JP20100129262, are in fact the same document, translation is submitted herewith).

* cited by examiner

| URI | TimeStamp | Cache-Control | Pragma | Expires | ETag | Last-Modified | Vary | User |
|---|---|---|---|---|---|---|---|---|
| URI1 | TS1 | CC1 | P1 | E1 | ET1 | LM1 | F1=V1 | User1 |
| URI2 | TS2 | CC2 | P2 | E2 | ET2 | LM2 | F2=V2 | User2 |
| URI3 | TS3 | CC3 | P3 | E3 | ET3 | LM3 | F3=V3 | User3 |
| URI4 | TS4 | CC4 | P4 | E4 | ET4 | LM4 | F4=V4 | User4 |
| ... | ... | ... | ... | ... | ... | ... | ... | ... |

| START LINE | MESSAGE HEADER | MESSAGE BODY |
|---|---|---|
| GET Pass1/File1... | Accept...Host...If-Modified-Since...If-None-Match...Date...Last-Modified... | |
| HTTP/1.1 304... | ... | ... |
| GET Pass2/File2... | Accept...Host...If-Modified-Since...If-None-Match...Date...Last-Modified... | |
| HTTP/1.1 304... | ... | ... |

FIG. 11B

| START LINE | MESSAGE HEADER | MESSAGE BODY |
|---|---|---|
| GET Pass1/File1... | Accept...Host...If-Modified-Since...If-None-Match...Date...Last-Modified... | |
| HTTP/1.1 304... | ... | ... |

REPRODUCING A GRAPHICAL USER INTERFACE DISPLAY

CROSS-REFERENCE TO RELATED APPLICATIONS

The present application is a continuation of and claimed priority under 35 U.S.C. §120 to U.S. application Ser. No. 13/151,068, filed Jun. 1, 2011, entitled "REPRODUCING A GRAPHICAL USER INTERFACE DISPLAY," which is incorporated herein by reference in its entirety. In turn, U.S. application Ser. No. 13/151,068 claims priority pursuant to 35 U.S.C. §119(a) from Japanese Patent Application No. 2010-129262, filed on Jun. 4, 2010, which is incorporated herein by reference in its entirety.

BACKGROUND

Aspects of the present invention relate in general to reproducing a graphical user interface display, and more particularly, to reproducing a graphic user interface display based on data transmitted over a network between a server system and a client device. Graphical user interfaces are used to display content to a user. One type of graphical user interface is a web page. Web pages are often represented by Hyper Text Markup Language (HTML). The HTML code often references several files in order to display the web file. These files may be for images, text, or other objects. These sub-files may be cached by proxy servers between the server providing the web page and the client device viewing the web page. Additionally, the client device that displays the web-page may cache some of the files locally.

When a user accesses a web page, the client system displaying that web page will first determine whether any of the files have been cached locally or by proxy servers between the client device and the server providing the web page. If it is determined that any of these files have been cached, then it will next determine whether these cache files are valid. It may be the case that the files have been updated since they were cached. If the cached files are still valid, then the client system does not have to wait as long to receive the file from the server. This reduces traffic on the network.

In many computing applications, a second client device may wish to view the same web page being viewed by a first client device. A graphical user interface display reproduction system may be used to reproduce the image associated with a graphical user interface display on the first client. This reproduced image may then be sent to the second client for display. The graphical user interface display reproduction system may monitor network traffic between the server providing the web page and the first client device displaying the web page. However, the traffic may not include all of the files needed to create the full web page. This is because some of the files are cached at various places along the route between the server and the first client device.

BRIEF SUMMARY

A method for reproducing a graphical user interface display includes, with a graphical user interface display reproduction system, extracting data from network traffic being sent from a server to a first client device, the network traffic including cacheable files used to create a graphical user interface display on the first client device, with the reproduction system, storing the cacheable file in a trace file associated with the first client device, and with the reproduction system, sending the cacheable file to a second client device in response to a request from the second client device.

A computing system used for graphical user interface image reproduction includes a processor and a memory communicatively coupled to the processor. The processor is configured to extract data from network traffic being sent from a server to a first client device, the network traffic including cacheable files used to create a graphical user interface display on the first client device, store the cacheable file in a trace file associated with the first client device, and send the cacheable file to a second client device in response to a request from the second client device.

A computer program product for reproducing a graphical user interface display includes a computer readable storage medium having computer readable code embodied therewith. The computer readable program code includes computer readable program code configured to extract data from network traffic being sent from a server to a first client device, the network traffic including cacheable files used to create a graphical user interface display on the first client device, computer readable program code configured to store the cacheable file in a trace file associated with the first client device, and computer readable program code configured to send the cacheable file to a second client device in response to a request from the second client device.

A method for reproducing a graphical user interface display includes, with a graphical user interface display reproduction system, extracting data from network traffic being sent from a server to a first client device, the network traffic including cacheable files used to create a graphical user interface display on the first client device, with the reproduction system, storing the cacheable files in a trace file associated with the first client device for a particular user at a particular point in time, and with the reproduction system, sending at least one of the cacheable files to a second client device for display of the graphical user interface display on the second client device, in response to a request for the at least one of the cacheable files from the second client device. The request from the second client device is made to the reproduction system in response to intercepting a response packet destined for the first client device, the response packet not including the cacheable file.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 10 is a table showing an example of additional information to be stored with cacheable files as a result of the cacheable file determination process using strict logic, according to one example of principles described herein.

FIGS. 11A and 11B are tables showing an example of a trace to be compared with the additional information stored as the result of the cacheable file determination process using strict logic, according to one example of principles described herein.

Throughout the drawings, identical reference numbers designate similar, but not necessarily identical, elements.

DETAILED DESCRIPTION

Figure 1:
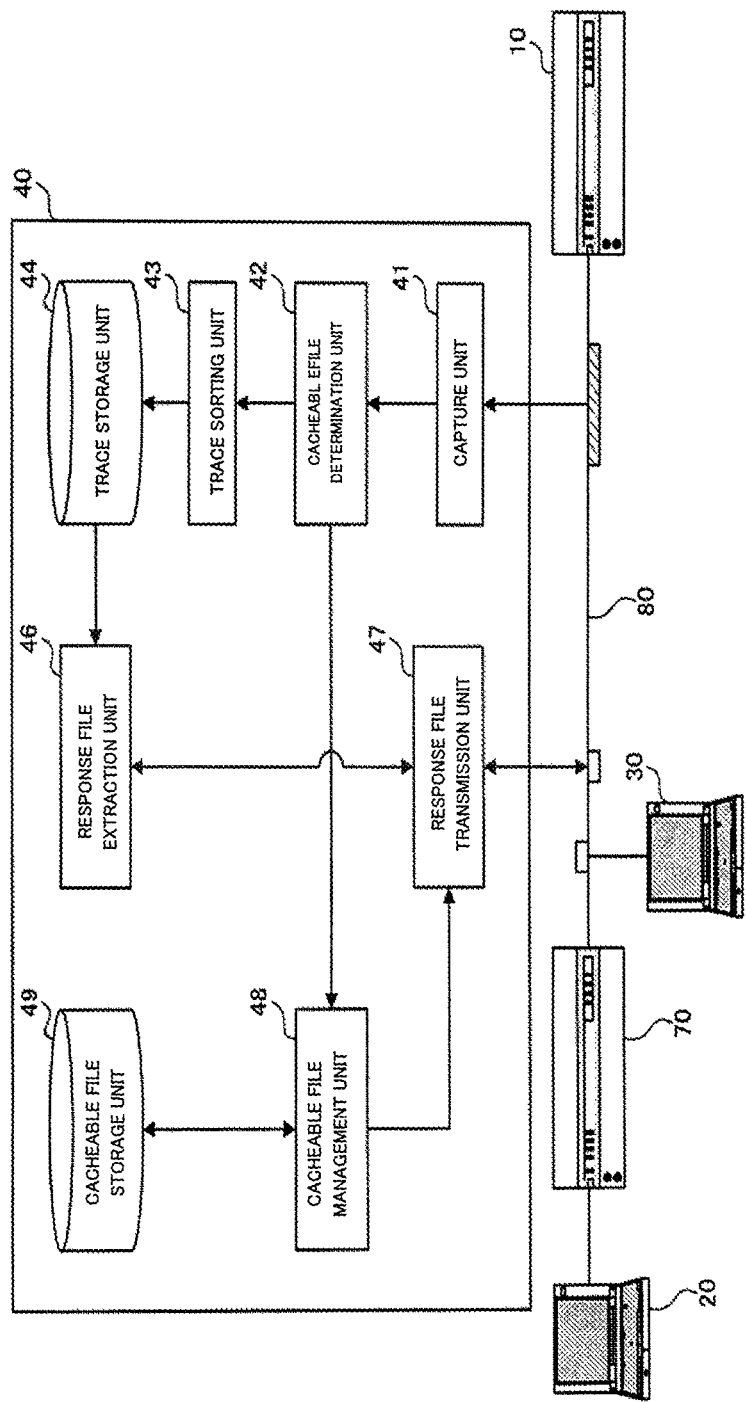
FIG. 1 is a block diagram showing an illustrative computer system, according to one example of principles described herein.

As mentioned above, in many computing applications, a second client device may wish to view the same web page that is being viewed or has been viewed in the past by a first client device. A graphical user interface display reproduction system may be used to reproduce the image associated with a graphical user interface display on the first client. This reproduced image may then be sent to the second client for display. The graphical user interface display reproduction system may monitor network traffic between the server providing the web page and the first client device displaying the web page. However, the traffic may not include all of the sub-files needed to create the full web page. This is because some of the files are cached at various places along the route between the server and the first client device.

The data that makes up a web page is often transferred over the Internet using Hyper Text Transfer Protocol (HTTP). HTTP defines a validation model and an expiration model for caching processes. In the case of the validation model, a client checks the server to determine if a cached file is valid. If the file is valid, then the server only returns a response indicating that the file is valid and does not send a copy of the cached file. However, if the cached file is invalid, then the server will send a response communication indicating that the cached file is invalid. This response communication will also include the updated file. This file will be hereinafter referred to as the response file. In the case of the expiration model, a cached file will include an expiration time. Here, the client does not need to check if a file is invalid or not. However, when the cached file expires, the client will have to request the updated file from the server. Using either model, interception of a single communication between the client and server will not include all the files needed to reproduce the web page.

In light of this and other issues, the present specification discloses methods for intercepting communications between a client and server and processing the data intercepted from those communications in a manner that will allow a graphical user interface display reproduction system to readily provide a reproduced graphical user interface display such as a web page. According to certain illustrative examples, a cacheable file is extracted from network trace. A network trace refers to an intercepted communication. The cacheable file is then stored in a storage apparatus.

To reproduce the web page on a second client device, the graphical user interface display reproduction system can intercept a response communication. If that communication does not include all of the files needed to reproduce the desired display image, then the graphical user interface display reproduction system can retrieve the needed files from the storage apparatus. In one example, the graphical user interface display reproduction system can determine whether a communication includes a cacheable file by viewing the HTTP header information associated with that communication. The HTTP header information is stored with the cacheable file that is included in the response communication.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram showing a configuration example of a computer system. As shown in FIG. 1, the computer system includes a web system (10), a first client (20), a second client (30), and a graphical user interface display reproduction system (40). Each of these components is connected to a network (80) such as the Internet. The client (20) is connected to the network (80) through a proxy (70) such as a proxy server.

The web system (10) may be embodied on a server that provides various services upon request from a web browser installed on a client device (20). The web system (10) is monitored by the graphical user interface display reproduction system (40). The client devices (20) and (30) are terminal devices to be operated by users. One of the clients, i.e., the first client (20) is the terminal device used by a general user to utilize the web system (10). While FIG. 1 shows only one first client (20), multiple clients (20) may be connected to the network (80). In such a case, the first client (20) refers to one of those multiple client devices. Throughout this specification, the term user indicates a user that operates one of the first client devices (20). The second client device refers to a terminal device that is used to reproduce an image that is being displayed on the first client device (20). For example, the second device (30) may reproduce an web page that is being displayed on the client device (20).

The graphical user interface display reproduction system (40) performs the process of reproducing an image from a graphical user interface display such as a web page. According to one illustrative example, a cacheable file is extracted from a network trace that is being captured. The extracted cacheable file is then stored in a storage unit. If the trace does not include a part of the image to be displayed by the first client (20), the stored cacheable files are used to reproduce the display image. In the following description, a display image is reproduced in response to a display image reproduction request from the second client device (30). The reproduced display image is then sent to the second client device (30) for display. However, the graphical user interface display reproduction system 40 may reproduce a display image in response to a reproduction request from its own user interface and display that image on its own display.

As shown in FIG. 1, the graphical user interface display reproduction system (40) includes a capture unit (41), a cacheable file determination unit (42), a trace sorting unit (43), a trace storage unit (44), a response file extraction unit (46), a response file transmission unit (47), a cacheable file management unit (48), and a cacheable file storage unit (49). The capture unit (41), cacheable file determination unit (42), trace sorting unit (43), response file extraction unit (46), response file transmission unit (47) and cacheable file management unit (48) are realized by a CPU 90a (see FIG. 14) that reads programs from a non-volatile memory device 90g (see FIG. 14) into a main memory 90c (see FIG. 14) for execution. The trace storage unit (44) and the cacheable file storage unit (49) may be realized by a non-volatile memory device 90g (see FIG. 14).

The capture unit (41) captures a network trace from traffic on the network (80). This trace may be captured by a mirror port or network tap connection. The cacheable file determination unit (42) then analyzes an HTTP response packet (hereinafter referred to as the "response packet") in the capture trace and determines whether there is a response file included in the response packet that is cacheable. When determining that the response file is cacheable, the cacheable file determination unit (42) extracts a response header and the response file from the response packet. The cacheable file determination unit (42) then sends the response header and the response file to the cacheable file management unit (48). Throughout this specification, a message header of the response packet is referred to as the "response header". The response header may include a general header and an entity header defined as by HTTP.

The trace sorting unit (43) sorts the capture traces according to the destination client of those traces. The trace sorting unit (43) may create multiple trace files, one for each destination client. Here, the trace files may be created continuously while the capture unit (41) is capturing the traces. Additionally or alternatively, the trace files may be created in pull fashion by selecting a particular client device (20) on which a display image has been displayed. The trace storage unit (44) stores the multiple trace files created by the trace sorting unit (43).

The response file extraction unit (46) extracts an HTTP request packet (hereinafter referred to as the "request packet") and the response packet from the trace file stored in the trace storage unit 44, and holds the extracted packets. Then, the response file extraction unit (46) extracts the response file sent to the browser of the client device (20) from the response packet. The response file extraction unit (46) also performs the process of specifying a display image displayed on the client device 20 by the user.

When the response file requested by the second client device (30) is extracted by the response file extraction unit (46), the response file transmission unit (47) transmits the extracted response file to the client device (30). However, when the response file requested by the client device (30) is not extracted by the response file extraction unit (46) and a status code in the response packet held by the response file extraction unit (46) is "304 (Not Modified)", the response file transmission unit (47) selects an appropriate cacheable file from the cacheable file storage unit (49) through the cacheable file management unit (48), and transmits the selected cacheable file as a response file to the client device (30). In this event, the response file transmission unit (47) also performs a rewrite process of rewriting a portion of the response file referring to a URL (Uniform Resource Locator) in the web system (10) to refer to the graphical user interface display reproduction system (40). The response header in the response packet to be transmitted by the response file transmission unit (47) should include a "Cache-Control: no-cache" line to prevent unintentional caching of files by the browser of the second client device (30).

The cacheable file management unit (48) stores, in the cacheable file storage unit (49), the body of the response file received from the cacheable file determination unit (42) together with any additional information in the response header also received from the cacheable file determination unit (42). The cacheable file management unit (48) also selects from the cacheable file storage unit (49), a cacheable file to be transmitted as a response file upon request from the response file transmission unit (47). The cacheable file storage unit (49) stores the cacheable file together with the additional information.

Figure 2:
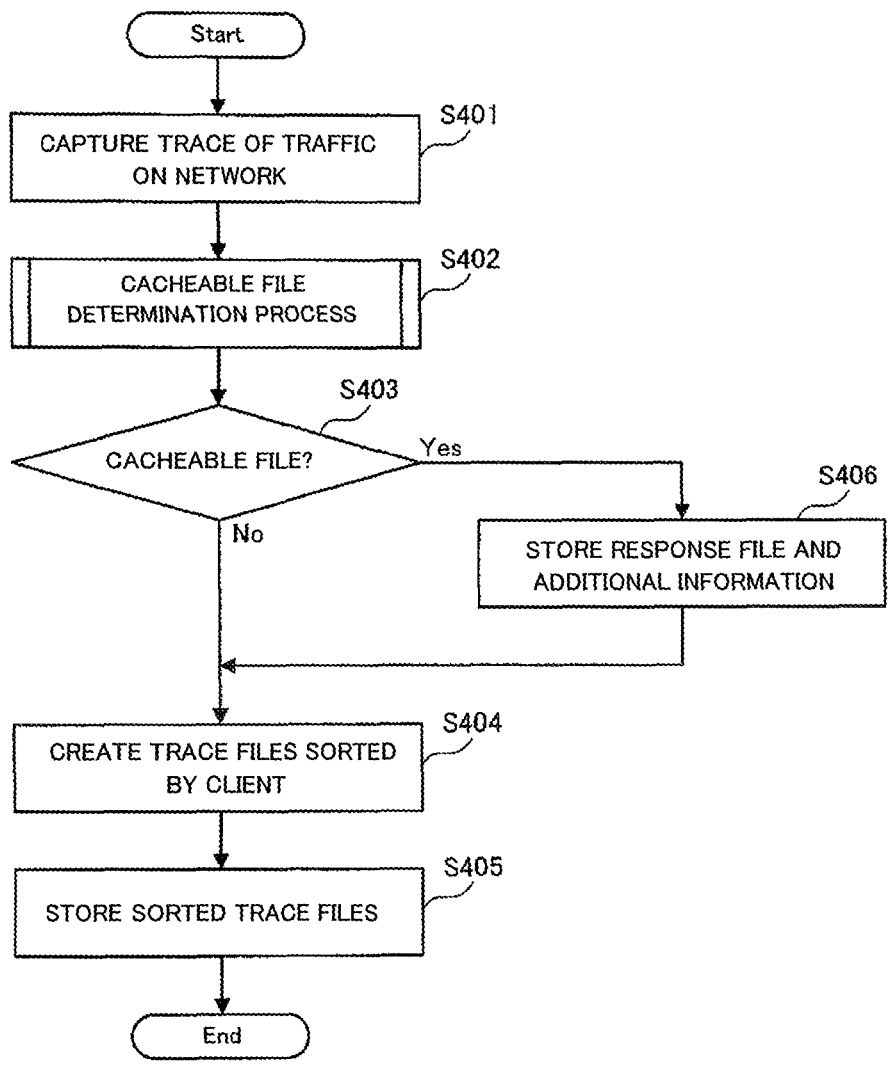
FIG. 2 is a flowchart showing an example of cacheable file storage by a graphical user interface display reproduction system, according to one example of principles described herein.

FIG. 2 is a flowchart showing an example of cacheable file storage by the graphical user interface display reproduction system (40). According to certain illustrative examples, the capture unit (41) first captures (S401) a trace of traffic on the network (80). Here, the trace may be captured by using a mirror port serving as a switch on the network (80) or by inserting a tap into the network (80). Next, the cacheable file determination unit (42) performs a cacheable file determination process of analyzing (Step 402) a response packet in the captured trace to determine whether a response file included in the response packet is cacheable.

The cacheable file determination unit (42) then determines (S403) whether the result of the cacheable file determination process shows that the response file is cacheable. If it is determined (S403, NO) that the response file is not cacheable, then the cacheable file determination unit (42) hands over the control without any processing to the trace sorting unit (43). Because multiple sets of data transmissions to multiple client devices are mixed into a single trace, the trace sorting unit (43) creates (S404) trace files sorted according to destination client device. Each trace file includes data received through traces that are destined for a particular client device (20). Then, the trace files are stored (S405) in the trace storage unit 44.

If it is determined (S403, YES) that the response file is indeed cacheable, then the cacheable file determination unit (42) extracts the response file and a response header from the response packet in the trace. The cacheable file determination unit then stores (S406) in the body of the response file and additional information associated with that body in the cacheable file storage unit (49).

Specifically, the cacheable file determination unit (42) sends the extracted response file and response header to the cacheable file management unit (48). Then, the cacheable file management unit (48) retrieves relevant additional information from the response header. The cacheable file management unit (48) then stores the cacheable file body and the additional information in the cacheable file storage unit (49). Alternatively, a configuration may be adopted in which the cacheable file determination unit (42) extracts the response file and relevant additional information in the response header from the response packet in the trace and sends them to the cacheable file management unit (48). Then, the cacheable file management unit (48) stores such information in the cacheable file storage unit (49). Thereafter, the cacheable file determination unit (42) hands control to the trace sorting unit (43).

Figure 3:
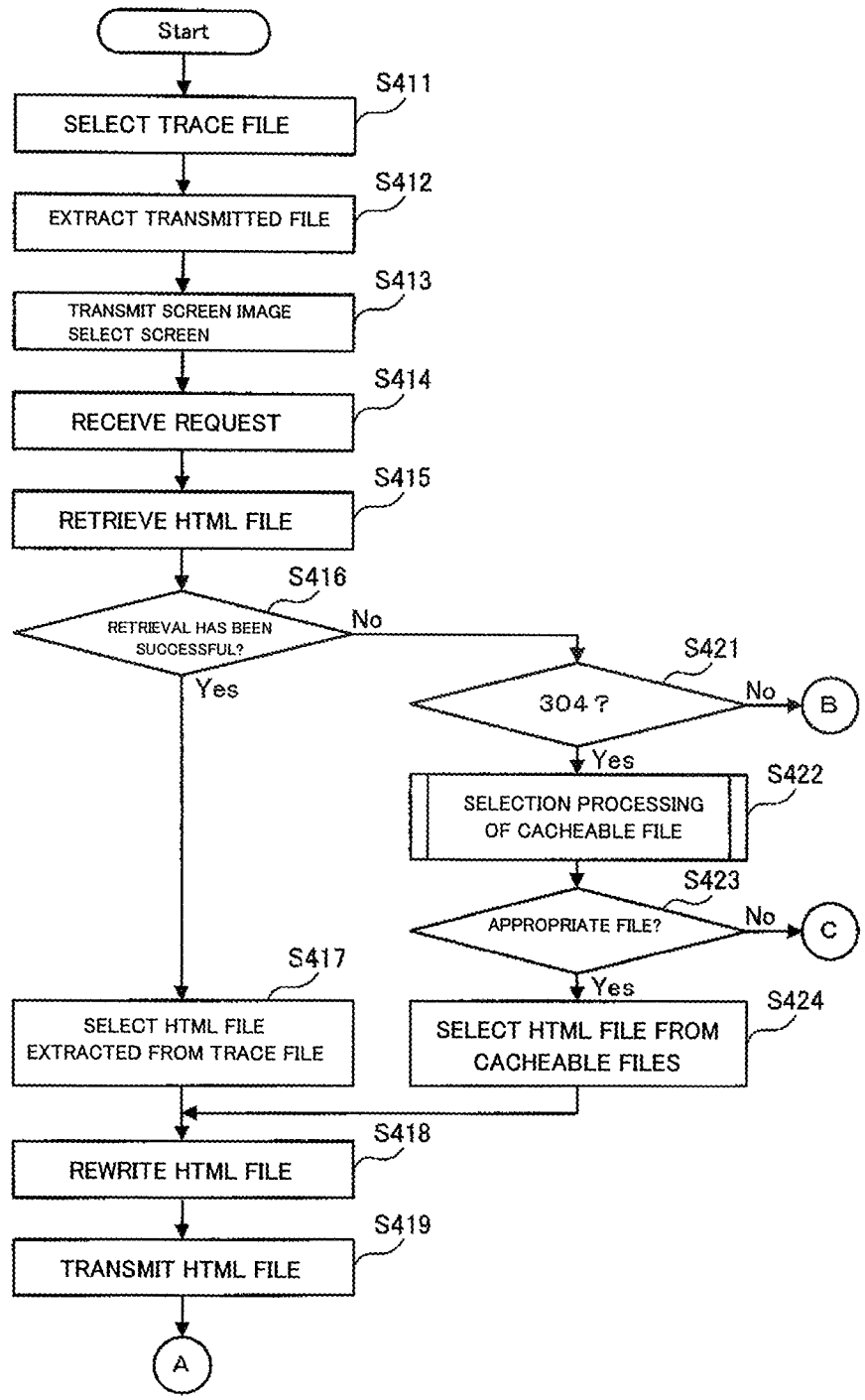
FIG. 3 is a flowchart showing an example of graphical user interface display reproduction by a graphical user interface display reproduction system, according to one example of principles described herein.
Figure 4:
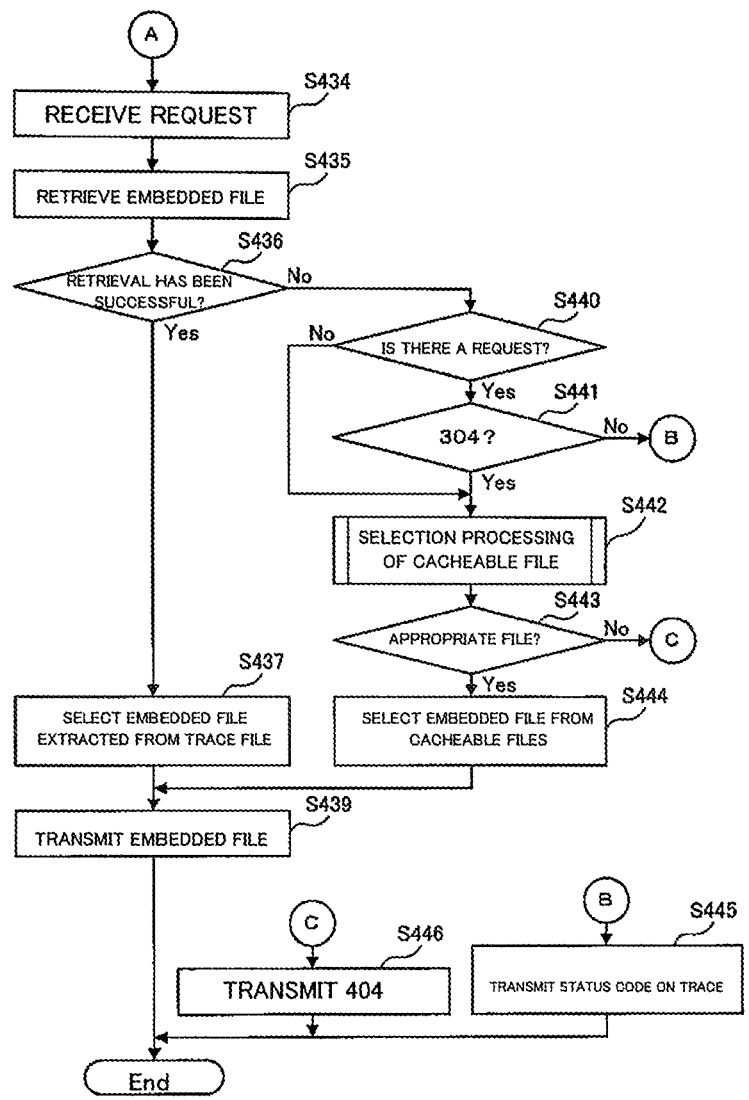
FIG. 4 is a flowchart showing an example of graphical user interface display reproduction by the graphical user interface display reproduction system, according to one example of principles described herein.

FIGS. 3 and 4 are flowcharts showing an example of display image reproduction by the graphical user interface display reproduction system (40). According to certain illustrative examples, the response file extraction unit (46) first selects (Step 411) a trace file from the trace storage unit (44). The trace file is to be used to reproduce the graphical user interface image. Specifically, the response file extraction unit (46) receives information from the client device (30) that indicates that a certain user wishes to reproduce a graphical user interface display as displayed at a particular point in time. The response file extraction unit (46) then reads the appropriate portion of the trace file for the client device (20) corresponding to that particular point in time. In this example, the traces are managed for a term that extends from the time a user logs into the web system (10) to the time the user logs out of that web system (10). Accordingly, a portion of the trace file corresponding to a particular point in time includes only a trace related to an operation by one user.

Next, the response file extraction unit (46) extracts (Step 412) the response file transmitted to the browser of the client device (20) from the selected trace file. In this case, a request packet and a response packet may be extracted from the trace file. Furthermore, a response file may be extracted from the response packet. The response file mentioned here includes a Hyper Text Markup Language (HTML) file corresponding to a graphical user interface display and an embedded file that is embedded in the HTML file.

As described above, the trace file includes multiple graphical user interface displays obtained by a series of operations initiated by the user of the client device (20). The response file extraction unit (46) generates a graphical user interface select screen for selecting which one of the multiple graphical user interface displays is to be reproduced, and transmits (Step 413) the graphical user interface display select screen to the browser of the client device (30).

Thus, the graphical user interface display select screen is displayed on the browser of the client device (30). Here, the graphical user interface display select screen includes a list of HTML files corresponding to the graphical user interface displays that are displayed by the user performing the series of operations. Therefore, a specific user who wishes to reproduce a graphical user interface display selects an HTML file corresponding to the graphical user interface display that he or she wishes to reproduce from among the HTML files included in the list.

The browser of the client device (30) then transmits a request for the selected HTML file to the graphical user interface display reproduction system (40). The response file transmission unit (47) of the graphical user interface display reproduction system (40) receives (Step 414) the HTML file request. Then, the response file transmission unit (47) retrieves (Step 415) the HTML file that is being requested from among the response files extracted by the response file extraction unit (46) and determines (Step 416) whether the retrieval is successful.

When the retrieval is successful (Step 416, YES), i.e., when the target HTML file is included in the response files extracted by the response file extraction unit (46), the response file transmission unit (47) selects (Step 417) the HTML file. Then, the response file transmission unit (47) performs a rewrite process of rewriting (Step 418) the HTML file. During the rewrite process, if a portion of the HTML file referring to a Uniform Resource Locator (URL) is retrieved, and if the reference destination is the web system (10), then that portion of the HTML file is rewritten to refer to the graphical user interface display reproduction system (40). Thereafter, the response file transmission unit (47) transmits (Step 419) the rewritten HTML file to the client device (30).

If the retrieval is not successful (Step 416, NO), i.e., when the target HTML file is not included in the response files extracted by the response file extraction unit (46), then the response file transmission unit (47) determines (Step 421) whether the response packet corresponding to the request packet requesting the target HTML file among the request packets held by the response file extraction unit (46) includes the status code "304 (Not Modified)".

If it is determined that the response packet includes (Step 421, YES) the status code "304 (Not Modified)", then the response file transmission unit (47) hands control to the cacheable file management unit (48). The cacheable file management unit (48) performs a cacheable file selection process of selecting (Step 422) an appropriate cacheable file from among the cacheable files stored in the cacheable file storage unit (49). In the cacheable file selection process, it is determined whether a predetermined condition for determining that the cacheable file is suitable to be used for reproducing a graphical user interface display is satisfied.

Subsequently, the response file transmission unit (47) determines (Step 423) whether information indicating that there is an appropriate cacheable file has been returned by the cacheable file management unit (48). If it is determined (Step 423, YES) that the information indicating that there is an appropriate cacheable file has been returned, then the response file transmission unit (47) selects (Step 424) the HTML file that is the cacheable file determined to be appropriate by the cacheable file management unit (48). Then, the response file transmission unit (47) performs a rewrite process of rewriting (Step 418) the HTML file and the process continues from there. The transmitted HTML file is displayed on the browser of the client device (30). Then, the browser of the client device (30) transmits an embedded file request to the graphical user interface display reproduction system (40) based on a URL reference embedded in the HTML file.

As shown in FIG. 4, the response file transmission unit (47) in the graphical user interface display reproduction system (40) receives (Step 434) the embedded file request.

Then, the response file transmission unit (47) retrieves (Step 435) the embedded file that is being requested from among the response files extracted by the response file extraction unit (46) and determines (Step 436) whether the retrieval is successful.

If the retrieval is successful (Step 436, YES), i.e., when the target embedded file is included in the response files extracted by the response file extraction unit (46), then the response file transmission unit (47) selects (Step 437) the embedded file. Then, the response file transmission unit (47) transmits (Step 439) the embedded file to the client device (30).

If the retrieval is not successful (Step 436, NO), i.e., when the target embedded file is not included in the response files extracted by the response file extraction unit (46), then the response file transmission unit (47) determines (Step 440) whether there is a response packet corresponding to the request packet requesting the target embedded file among the request packets held by the response file extraction unit (46). Such determination is made because the request packet may not exist in the trace in the first place such as in the case of the expiration model. When it is determined (Step 440, NO) that there is no request packet requesting the target embedded file, then the processing proceeds directly to Step 442. If it is determined (Step 440, YES) that there is the request packet requesting the target embedded file, then it is determined (Step 441) whether the response packet corresponding to the request packet includes the status code "304 (Not Modified)".

If it is determined (Step 441, YES) that the response packet includes the status code "304 (Not Modified)" or if it is determined that the request packet does not exist in Step 440, then the response file transmission unit (47) hands control to the cacheable file management unit (48). The cacheable file management unit (48) performs a cacheable file selection process of selecting (Step 422) an appropriate cacheable file from among the cacheable files stored in the cacheable file storage unit (49).

Subsequently, the response file transmission unit (47) determines (Step 443) whether information indicating that there is an appropriate cacheable file has been returned from the cacheable file management unit (48). If it is determined (Step 443, YES) that the information indicating that there is an appropriate cacheable file that has been returned, the response file transmission unit (47) selects (Step 444) the embedded file that is the cacheable file determined to be appropriate by the cacheable file management unit (48). Then, the response file transmission unit (47) transmits (Step 439) the embedded file to the client device (30).

Thus, the embedded file is received by the browser of the client device (30). When the embedded file is embedded in the HTML file by the browser function, the same graphical user interface display as that displayed on the client device (20) is displayed. Thus, the graphical user interface display reproduction for one graphical user interface display is completed.

As the case where it is determined in Step 421 or 441 that the response packet does not include the status code "304 (Not Modified)", it is possible that neither a "200 (OK)" nor a "304 (Not Modified)" code is recorded in the trace due to occurrence of an error in the web system (10). In such a case, the response file transmission unit (47) transmits a response packet (with no HTML file) to the browser of the client device (30) in which the same status code as that recorded in the trace is set (Step 445).

Alternatively, where it is determined in Step 421 or 441 that the response packet does not include the status code "304 (Not Modified)", it is possible that although the web system (10) is properly operating, the file cannot be correctly retrieved due to packet loss caused by an error in the graphical user interface display reproduction system (40).

When it is determined in Step 423 or 443 that the information indicating that there is an appropriate cacheable file has not been returned, the response file transmission unit (47) transmits (Step 446) a response packet including a status code "404 (Not Found)" to the client device (30) and then terminates the processing. As a result, a graphical user interface that includes a portion without a found cacheable file is left blank on the display when displayed by the browser of the second client device (30). Technically, the graphical user interface display reproduction has not been properly performed. Still, the graphical user interface display is effective when the user wishes to check how the graphical user interface display looks even though it is incomplete.

Alternatively, when it is determined in Step 423 or 443 that the information indicating that there is an appropriate cacheable file that has not been returned, the response file transmission unit (47) may transmit an error message to the browser of the client device (30) that indicates that "proper graphical user interface display reproduction cannot be executed due to lack of files required for graphical user interface display reproduction". This is effective when the user wishes to strictly confirm that the graphical user interface display reproduction has not been successful.

Figure 5:
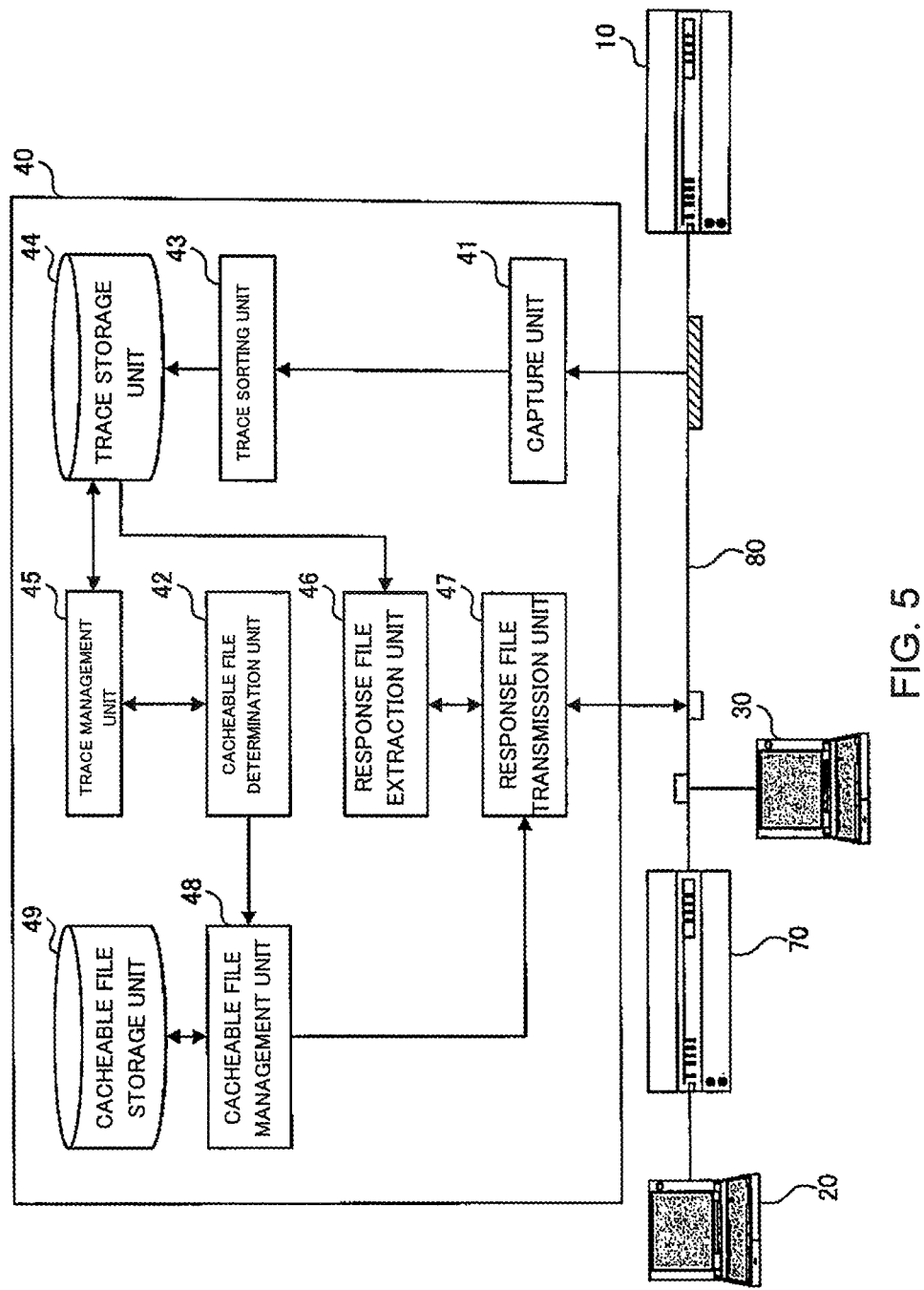
FIG. 5 is a block diagram showing an illustrative configuration of a computer system, according to one example of principles described herein.

FIG. 5 is a block diagram showing an example of a computer system embodying principles described herein. According to certain illustrative examples, the computer system includes a web system (10), a first client device (20), a second client device (30), and a graphical user interface display reproduction system (40). These components are connected to a network (80) such as the Internet. The first client device (20) is connected to the network (80) through a proxy (70) such as a proxy server. The web system (10) and the client devices 20) and (30) are the same as those described in FIG. 1. Thus, a description thereof will not be given.

The graphical user interface display reproduction system (40) performs processing for reproducing a graphical user interface display for display on the second client device (30). The graphical user interface displayed is one that has been displayed on the first client device (20) to a particular user at a particular point in time. A cacheable file is extracted at an appropriate timing from a captured trace which has been stored. The extracted cacheable file is then stored in a storage device. When the trace does not include a part of the graphical user interface display displayed by the particular user at the particular point in time, then the stored cacheable file can be used to reproduce the graphical user interface display. In the following description, a graphical user interface display is reproduced upon a reproduction request from the second client device (30), and the reproduced graphical user interface display is output to the client device (30). However, the graphical user interface display reproduction system (40) may reproduce a graphical user interface display upon graphical user interface display reproduction request from its own user interface, and display the reproduced graphical user interface display on its own display device.

The graphical user interface display reproduction system (40) includes a capture unit (41), a cacheable file determination unit (42), a trace sorting unit (43), a trace storage unit (44), a trace management unit (45), a response file extraction unit (46), a response file transmission unit (47), a cacheable file management unit (48), and a cacheable file storage unit (49).

The capture unit (41) captures a trace of network traffic from the network (80). The trace sorting unit (43) sorts the traces captured from the network according to destination client device to create multiple trace files. The trace files may be created continuously while the capture unit (41) is capturing the traces.

The trace storage unit (44) stores the multiple trace files created by the trace sorting unit (43). The trace management unit (45) manages a portion of the trace file stored in the trace storage unit (44) to the point where the determination process by the cacheable file determination unit (42) has been performed. Also, the trace management unit (45) reads, at an appropriate timing, a trace yet to be subjected to the determination process by the cacheable file determination unit (42).

The cacheable file determination unit (42) analyzes a response packet in the trace read by the trace management unit (45). The cacheable file determination unit (42) then determines whether a response file included in the response packet is cacheable. If the response file is cacheable, then the cacheable file determination unit (42) extracts a response header and the response file from the response packet. The response header and the response file are then sent to the cacheable file management unit (48). The response file extraction unit (46), the response file transmission unit (47), the cacheable file management unit (48) and the cacheable file storage unit (49) are the same as those in FIG. 1. Thus description thereof is omitted here.

In this example, a general user is utilizing the web system (10) by connecting to the web system (10) through the network (80) using the browser of the client device (20). In this state, the capture unit (41) captures a trace of network traffic from the network (80). Because a trace may include communication to multiple client devices (20), the trace sorting unit (43) creates trace files sorted according to destination client devices (20). Then, sorted trace files are stored in the trace storage unit (44).

The graphical user interface display reproduction system (40) stores cacheable files by a batch process at the appropriate timing. Note that examples of the appropriate timing include the timing at which the use of the graphical user interface display reproduction system (40) is started. Specifically, a user of the graphical user interface display reproduction system (40) may manually start the batch process at the point in time when the use of the graphical user interface display reproduction system (40) is started. Alternatively, if the continuous operation of the graphical user interface display reproduction system (40) increases the number of traces, a new batch process may be started every night. In this case, the batch process may be executed by automatically starting the graphical user interface display reproduction system (40) at a certain time every night.

Figure 6:
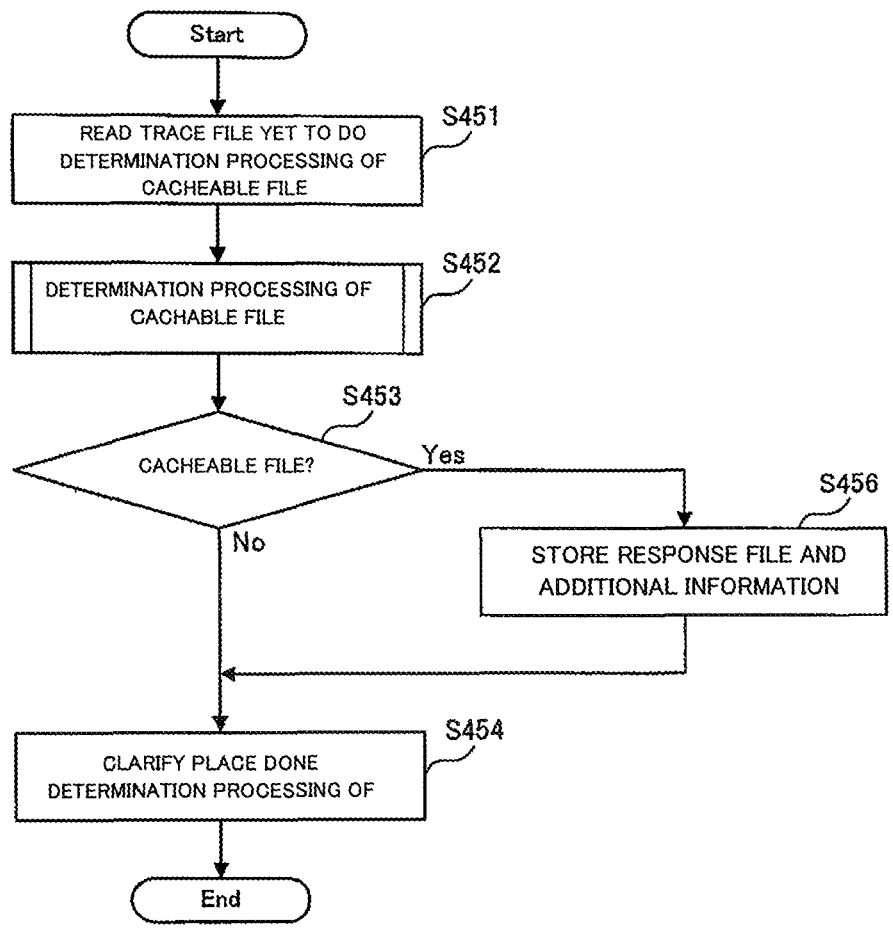
FIG. 6 is a flowchart showing an example of cacheable file storage by the graphical user interface display reproduction system, according to one example of principles described herein.

FIG. 6 is a flowchart showing an example of cacheable file storage performed by the graphical user interface display reproduction system (40). The operations in this flowchart are started by starting the batch process described above. According to certain illustrative examples, the trace management unit (45) first sequentially reads (Step 451), from the trace storage unit (44), traces that are yet to be subjected to the determination process by the cacheable file determination unit (42).

The cacheable file determination unit (42) performs (Step 452) a cacheable file determination process of analyzing a response packet in the trace to determine whether a response file included in the response packet is cacheable. The process of determining whether a file is cacheable or not will be described in more detail below.

The cacheable file determination unit (42) then determines (Step 453) whether the result of the cacheable file determination process indicates that the response file is cacheable. If it is determined (Step 453, NO) that the response file is not cacheable, then the cacheable file determination unit (42) returns control to the trace management unit (45). The trace management unit (45) then makes (Step 454) a portion of the trace subject to the determination process identifiable to the cacheable file determination unit (42) so that the processing can be continued in the next batch process. For example, it may be recorded that the processing has been completed up to a particular portion of the captured trace.

If it is determined (Step 453, YES) that the response file is cacheable, then the cacheable file determination unit (42) extracts the response file and a response header from the response packet in the trace. The body of the response file and additional information in the response header are then stored (Step 456) in the cacheable file storage unit (49) by the cacheable file management unit (48).

Specifically, the cacheable file determination unit (42) sends the extracted response file and response header to the cacheable file management unit (48). Then, the cacheable file management unit (48) retrieves relevant additional information from the response header and stores the body of the cacheable file and the additional information in the cacheable file storage unit (49). Alternatively, a configuration may be adopted in which the cacheable file determination unit (42) extracts the response file and relevant additional information in the response header from the response packet and sends them to the cacheable file management unit (48). Then, the cacheable file management unit (48) stores such information in the cacheable file storage unit (49).

The cacheable file determination unit (42) then returns the control to the trace management unit (45). The trace management unit (45) then makes (Step 454) a portion of the trace subject to the determination process identifiable to the cacheable file determination unit (42) so that the processing can be continued in the next batch process. For example, it may be recorded that the processing has been completed up to a particular portion of the captured trace. The operations of the graphical user interface display reproduction system (40) for reproducing the graphical user interface display are the same as those described in the flowcharts shown in FIGS. 3 and 4. Thus, a description thereof is omitted.

The following will describe the process of determining whether an extracted file is cacheable. There is a simple logic and a strict logic for the cacheable file determination process and the cacheable file selection process. In one type of web system (10), a cacheable file can only be added or deleted. However, a cacheable file is not updated and the cacheable file is guaranteed to be shared by all users. Here, version control of the cacheable file is not required and there is only one cacheable file indicated by the same URI (Uniform Resource Identifier). In such a case, the simple logic will suffice.

However, there is a case in which the cacheable file can be not only be added or deleted but also updated. In this case, the contents of the cacheable file can vary according to the user. Here, there are multiple versions of cacheable files that vary according to time. The multiple cacheable files are indicated by the same URI may vary according to the user. In such a case, the strict logic can be used. The simple logic of the cacheable file determination process will be described first.

Figure 7:
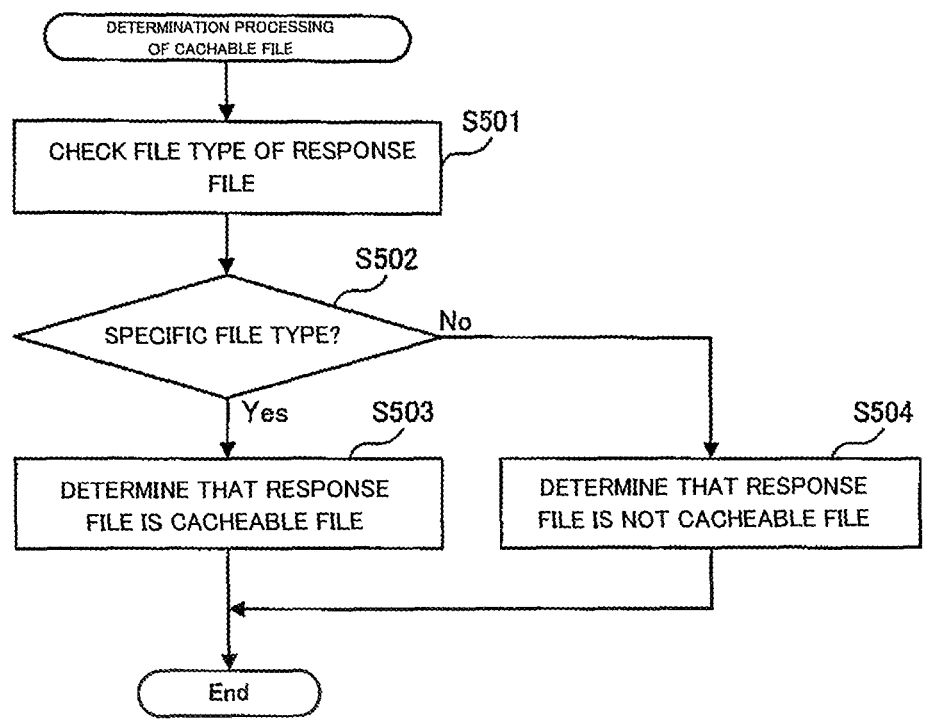
FIG. 7 is a flowchart showing an example of a cacheable file determination process using simple logic, according to one example of principles described herein.

FIG. 7 is a flowchart showing a cacheable file determination process in this case of using simple logic. First, the cacheable file determination unit (42) checks (Step 501) the file type of a response file. The cacheable file determination unit (42) then determines (Step 502) whether the file type of the response file matches a specific file type. Since the file type of the cacheable response file is a style sheet (CSS) or image file (Portable Network Graphics (PNG) or Graphics Interchange Format (GIF), these file types may be adopted as the specific file type.

If it is determined (Step 502, YES) that the file type of the response file matches a specific file type, then the cacheable file determination unit (42) determines (Step 503) that the response file is a cacheable file. However, if it is determined (Step 502, NO) that the file type of the response file does not match a specific file type that is known to be cacheable, then the cacheable file determination unit (42) determines (Step 504) that the response file is not a cacheable file.

In the simple logic, since it is determined whether the response file is the cacheable file based on only the file type, there is a possibility that a non-cacheable file is erroneously determined to be cacheable and stored. However, no problem arises even if such a situation occurs. This is because the non-cacheable file is supposed to be included in the trace for graphical user interface display reproduction. Thus, the file erroneously determined to be cacheable and stored is never used. Therefore, the file types of the files which are likely to be treated as cacheable files in the web system (10) may all be treated as a specific file type to be subjected to the determination of whether or not they are cacheable.

In the simple logic, when a file having the same URL and file name as those of the file already stored as the cacheable file is found from the trace, the cacheable file determination unit (42) does not need to redundantly store that file. Moreover, if the graphical user interface display reproduction system (40) can access the file on the web system (10), then the cacheable file determination process can be more easily implemented by directly copying a file of a file type that can be regarded as a static file on the web system (10). Alternatively the process can be implemented by directly accessing the file on the web system (10) upon request.

The response file that is determined to be cacheable in the cacheable file determination process described above is stored in the cacheable file storage unit (49). In the simple logic, the data to be stored includes the URI (host name, path and file name) and the body of the response file. Moreover, although not essential, a value of Content-Type field from the response header may be stored. The other fields of the response header are also optional.

Figure 8:
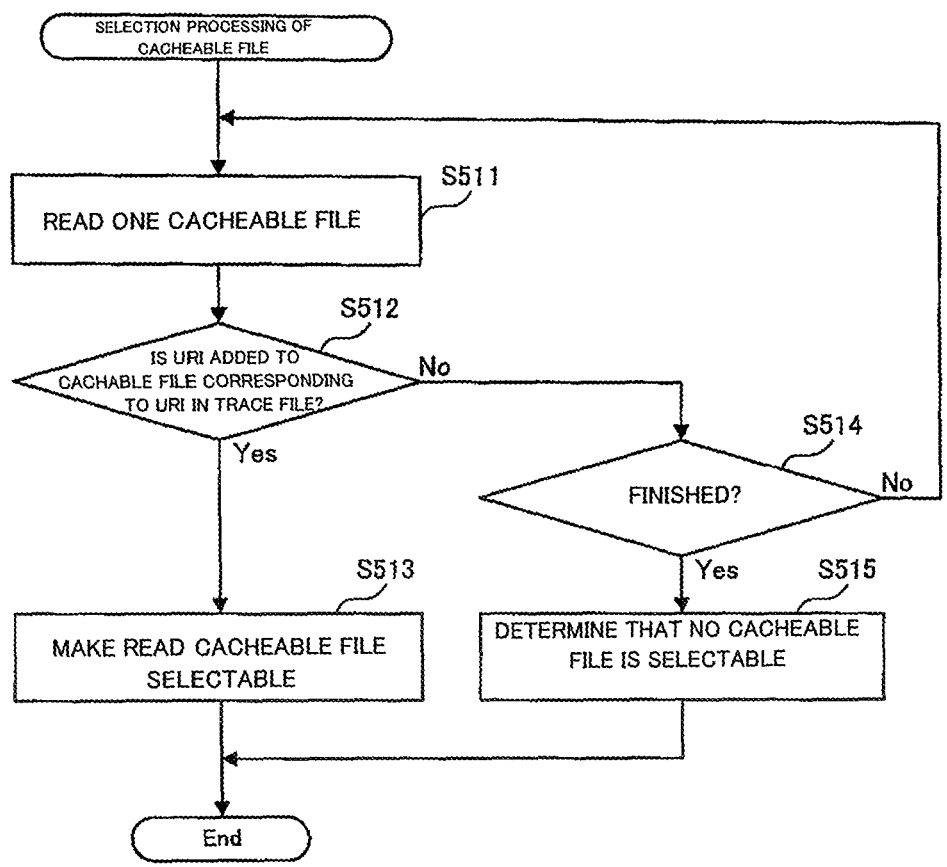
FIG. 8 is a flowchart showing an example of a cacheable file selection process using simple logic, according to one example of principles described herein.

Next, the simple logic of the cacheable file selection process will be described. FIG. 8 is a flowchart showing an example of a cacheable file selection process. According to certain illustrative examples, the cacheable file management unit (48) reads (Step 511) one cashable file from the cacheable file storage unit (49). It is then determined (Step 512) whether the URI added to the cacheable file corresponds to the URI (host name, path and file name) in the request packet from the trace.

If it is determined (Step 512, YES) that the URIs do correspond to each other, then the cacheable file management unit (48) determines (Step 513) that the cacheable file read in Step 511 is the cacheable file to be selected. However, if it is determined (Step 512, NO) that the URIs do not correspond to each other, then the cacheable file management unit (48) determines (Step 514) whether the processing for all the cacheable files stored in the cacheable file storage unit (49) is completed. If it is determined (Step 514) that the processing for all the cacheable files is not completed, then the process returns to Step 511 to execute the same processing for the next cacheable file. If it is determined (Step 514, YES) that the processing for all the cacheable files is completed, then the cacheable file management unit (48) determines (Step 515) that there is no cacheable file to be selected (Step 515).

Figure 9:
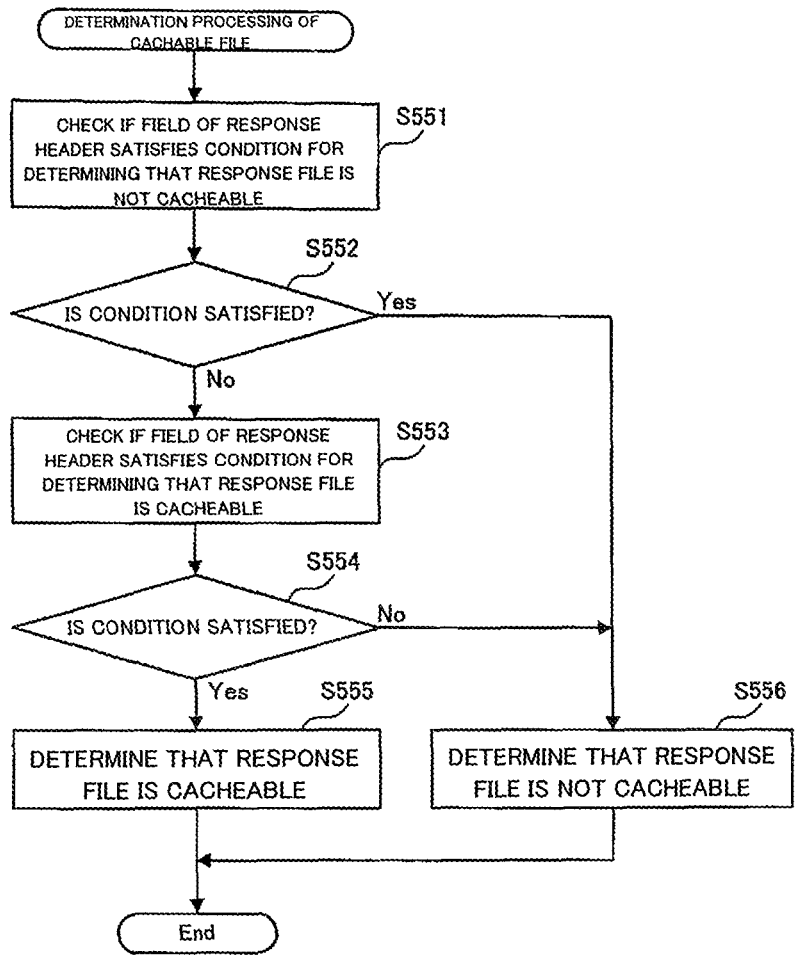
FIG. 9 is a flowchart showing an example of a cacheable file determination process using strict logic, according to one example of principles described herein.

The strict logic of the cacheable file determination process will now be described. FIG. 9 is a flowchart showing an example of a cacheable file determination process. According to certain illustrative examples, the cacheable file determination unit (42) first checks if a field of the response header satisfies the conditions determining that the response file is a cacheable file (Step 551). The conditions that indicate a response file is not cacheable include the condition that the Cache-Control field in the response header has a value of no-cache or no-store. Various other fields within the response file may indicate whether or not the file is cacheable.

The cacheable file determination unit (42) then determines (Step 552) whether any of the above mentioned conditions are satisfied. If it is determined (Step 552, YES) that the check result indicates that any of the above conditions are satisfied, then the cacheable file determination unit (42) determines (step 556) that the response file is not a cacheable file. If it is determined (Step 552, NO) that any of the above conditions are not satisfied, then the cacheable file determination unit (42) checks (Step 553) to see if the field of the response header satisfies the conditions for positively indicating that the response file is cacheable file. The conditions for determining that the response file is cacheable include a Cache-Control field with a value of public, private, max-age=#seconds, must-revalidate, and s-maxage. Other conditions which positively indicate that the file is cacheable may be used.

The cacheable file determination unit (42) then determines (Step 554) whether the check result shows that any of the above conditions are satisfied. If it is determined (Step 554, YES) that the check result indicates that any of the above conditions are satisfied, then the cacheable file determination unit (42) determines (Step 555) that the response file is cacheable. If it is not determined (Step 554, NO) that the check result indicates that any of the above conditions are satisfied, then the cacheable file determination unit (42) determines (Step 556) that the response file is not cacheable.

Using this strict logic, if a file having the same URL and file name as those of the file already stored as the cacheable file are found from the trace, then the cacheable file determination unit (42) may store the file as another cacheable file when the field values checked above are different. The cacheable file determination unit (42) may then prevent the file from being redundantly stored when the field values checked above are the same. The response file that is determined to be cacheable is then stored in the cacheable file storage unit (49).

FIG. 10 is a table showing an example of additional information to be stored in the cacheable file storage unit (49) together with the body of a response file. As shown in FIG. 10, the additional information includes URI, TimeStamp, Cache-Control, Pragma, Expires, ETag, Last-Modified, Vary and user ID. The URI includes a host name and a port number of the Host field of the request header. The URI also includes a path and a file name of a request line. Throughout this specification, a message header of the request packet is referred to as the "request header", which includes a general header and an entity header defined by the HTTP.

TimeStamp is the date and time of the capture of the response file by the graphical user interface display reproduction system (40). A Date field of the response header is set therein. Cache-Control is a value of Cache-Control field of the response header. Pragma is a value of Pragma field of the response header. Expires is a value of Expires field of the response header. ETag is a value of ETag field of the response header. Last-Modified is a value of Last-Modified field of the response header.

Vary is a field name that is a value of Vary field of the response header and a field value of the field name. In FIG. 10, "Fn" in "Fn=Vn" represents the field name and "Vn" represents the field value of the field name (n=1, 2, 3, 4, . . . ). The user ID is valid only when the cache-control field value is private and the user ID has been entered when the user logs into the client device (30). Moreover, although not essential, a value of Content-Type field of the response header may be stored. The other fields of the response header are optional.

The following is a description of a trace file to be compared with the additional information on a cacheable file. FIGS. 11 (a) and 11 (b) are tables showing examples of the contents of the trace file. FIG. 11 (a) shows an example of the contents of a trace when the validation model is used. As shown in the first row, the trace includes a start line, a message header and a message body. The second row from the top is a request packet for an HTML file. The third row from the top is a response packet corresponding to the request packet. Here, a status code "304" is returned in the start line of the third row. This shows that the HTML file body is not sent from the web system (10). The fifth row from the top is a request packet for an embedded file. The sixth row from the top is a response packet corresponding to the request packet. Here, the status code "304" is returned in the start line of the sixth row. This shows that the embedded file body is not sent from the web system (10).

FIG. 11 (b) shows an example of the contents of a trace when the expiration model is used. As shown in the first row, the trace includes a start line, a message header and a message body. The second row from the top is a request packet for an HTML file. The third row from the top is a response packet corresponding to the request packet. Here, a status code "304" is returned in the start line of the third row. This shows that the HTML file body is not sent from the web system (10). Moreover, unlike the case shown in FIG. 11 (a), no request packet is recorded for the embedded file in FIG. 11 (b). This shows that the request packet is not sent to the web system (10) and the embedded file body is not sent from the web system (10).

In FIGS. 11 (a) and 11 (b), the fields to be used for the cacheable file selection process are mainly shown for the message header. The description of other fields is omitted. Moreover, although not shown, a user ID is recorded in the trace file in association with a trace related to a series of operations by a certain user.

Figure 12:
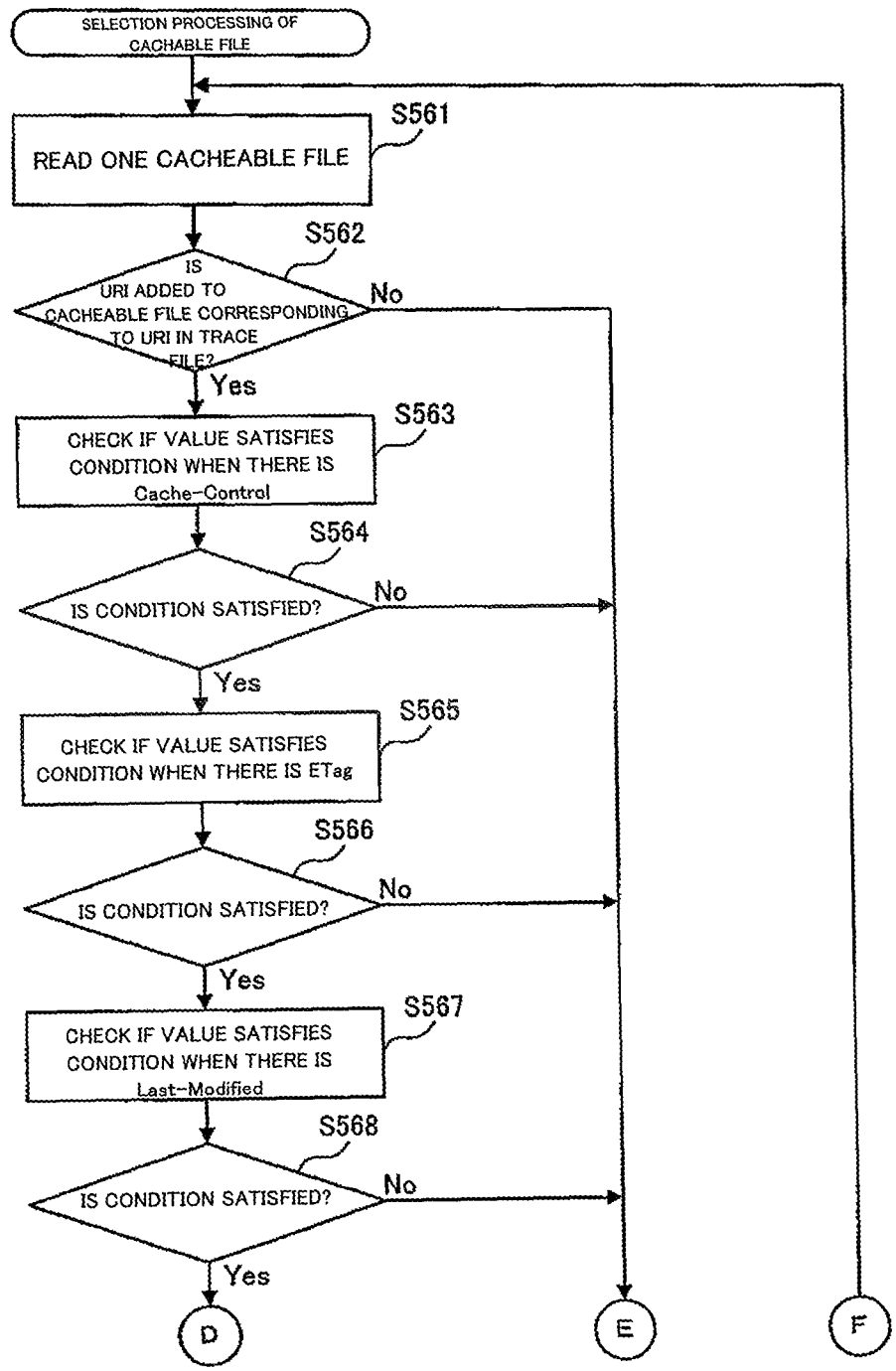
FIG. 12 is a flowchart showing an example of a cacheable file selection process using strict logic, according to one example of principles described herein.
Figure 13:
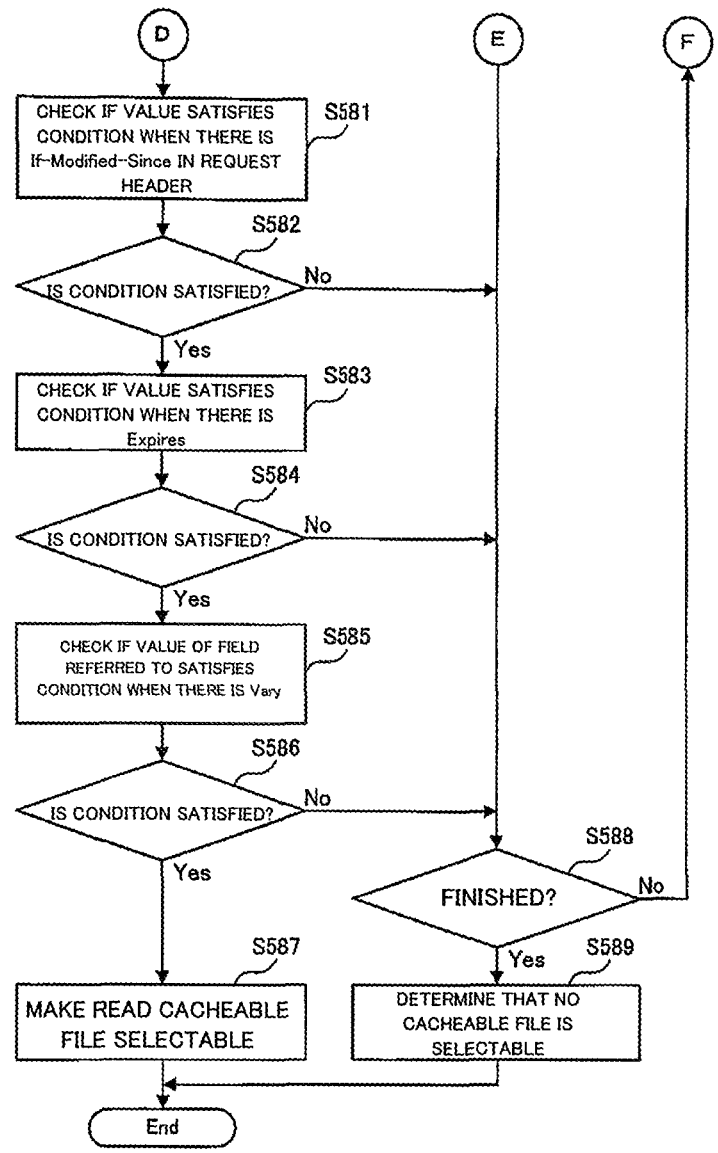
FIG. 13 is a flowchart showing an example of a cacheable file selection process using strict logic, according to one example of principles described herein.

Next, the strict logic of the cacheable file selection process is described. FIG. 12 and FIG. 13 are flowcharts showing examples of a cacheable file selection process. As shown in FIG. 12, the cacheable file management unit (48) first reads (Step 561) one cacheable file from the cacheable file storage unit (49). It is then determined (Step 562) whether the URI added to the cacheable file corresponds to the URI (host name, path and file name) in the request packet from the trace.

If it is determined (Step 562, YES) that the URIs correspond to each other, then the cacheable file management unit (48) performs the following comparison between the values in the additional information stored in the cacheable file storage unit (49) and the field values of the request header in the trace. Specifically, when Cache-Control is in the additional information, the cacheable file management unit (48) checks (Step 563) if the value thereof satisfies the conditions. Here, the conditions may include the condition that the value is public, the value is private and the user ID in the additional information and the user ID in the trace match, the value is s-maxage=#seconds and the time between TimeStamp in the additional information and the date and time shown in Date field of the request header in the trace is within #seconds, the value is max-age=#seconds and the time between TimeStamp in the additional information and the date and time shown in Date field of the request header in the trace is within #seconds, and the value is must-revalidate. Any information indicating that one of the above mentioned conditions may be used by the cacheable file management unit to determine if the file is cacheable.

It is then determined (Step 564) whether the check result indicates that the condition is satisfied. If it is determined (Step 564, YES) that the check result indicates that the condition is satisfied, then the cacheable file management unit (48) checks (Step 565), when ETag is in the additional information, if the value thereof satisfies the condition. Here, the condition is when the value corresponds to the ETag value shown in the If-None-Match field of the request header from the trace. That is, this step checks if the above condition is satisfied. If ETag is not in the additional information, any other information indicating that the condition is satisfied is set as the check result.

It is then determined (Step 566) whether the check result of step 565 indicates that the condition is satisfied. If it is determined (Step 566, YES) that the check result indicates that the condition is satisfied, then the cacheable file management unit (48) checks (Step 567), the Last-Modified field to determine if the value therein satisfies the condition. Here, the condition is one that the value corresponds to the Last-Modified field value of the request header in the trace.

It is then determined (Step 568) whether the check result of step 567 indicates that the condition is satisfied. If it is determined (Step 568, YES) that the check result indicates that the condition is satisfied, then, as shown in FIG. 13, the cacheable file management unit (48) checks (Step 581) the If-Modified Since field to determine if the value therein satisfies the condition. Here, the condition is one that the value corresponds to the If-Modified Since field value of the request header in the trace.

It is then determined (Step 582) whether the check result of step 581 indicates that the condition is satisfied. If it is determined (Step 582, YES) that the check result indicates that the condition is satisfied, then the cacheable file management unit (48) checks (Step 583), the Expires field to determine if the value therein satisfies the condition. Here, the condition is one that the value therein is newer than the date and time indicated by Date field of the request header in the trace.

However, if the Expires field is in the additional information, cache control is performed by the expiration model and there may be no request packet for the embedded file in the trace. In such a case, the Date field of the request packet for the embedded file cannot be used as the Date field described above. To solve this, the Date field of the request packet for the HTML file in which the embedded file is embedded is used instead. In the example shown in FIG. 11(b), since there is no request packet for the embedded file in the fourth row and after, the Date field of the request packet for the HTML file in the second row is used. Specifically, the date and time of Date field of the request packet for the HTML file is slightly earlier than the date and time of the embedded file request. However, since the cache control by the expiration model is performed when the strict logic is not used, this is not a problem. Although the above description has been given of the case where the Date field of the request packet for the HTML file in which the embedded file is embedded is used, the Date field of the request packet for any file to be used to reproduce a target graphical user interface display may be used.

It is then determined (Step 584) whether the check result of step 583 indicates that the condition is satisfied. If it is determined (Step 584, YES) that the check result indicates that the condition is satisfied, then the cacheable file management unit (48) checks (Step 585), the Vary field to determine if the value therein satisfies the condition. Here, the condition is that the field value indicated by Vary matches the field value of the request header in the trace.

It is then determined (Step 586) whether the check result of step 585 indicates that the condition is satisfied. If it is determined (Step 586, YES) that the check result indicates that the condition is satisfied, then the cacheable file management unit (48) determines (Step 587) that the cacheable file read in Step 561 is the cacheable file to be selected.

However, if it is determined (Step 562, NO; Step 564, NO; Step 566, NO; Step 568, NO; Step 584, NO; Step 586, NO) that the above mentioned check results are not satisfied, then the cacheable file management unit (48) determines (Step 588) whether the processing for all the cacheable files stored in the cacheable file storage unit (49) is completed. If it is determined (Step 588, NO) that the processing of all the cacheable files is not completed, then the process returns to Step 561 shown in FIG. 12 to perform the same processing for the next cacheable file. If it is determined (step 588, YES) that the processing for all the cacheable files is completed, then the cacheable file management unit (48) determines (Step 589) that there is no cacheable file to be selected.

As described above, a cacheable file is extracted from a trace and stored. The stored cacheable file is then used to reproduce a graphical user interface display that was displayed to a certain user at a particular point in time. Thus, both storage capacity for storing cacheable files and retrieval time for the cacheable file in graphical user interface display reproduction can be made practical.

Figure 14:
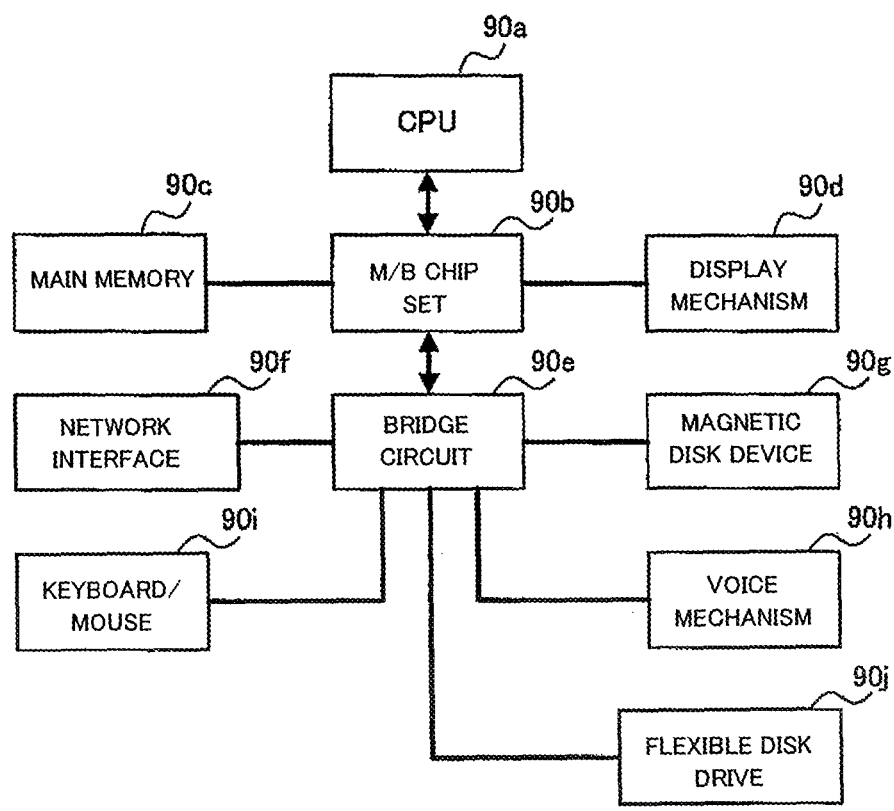
FIG. 14 is a diagram showing a hardware configuration of a computer to which an embodiment of the present invention can be applied, according to one example of principles described herein.

FIG. 14 is a diagram showing an example of hardware configuration for a computer that may be used to perform processes embodying principles described herein. As shown in FIG. 14, the computer includes: the CPU (Central Processing Unit) (90a), the main memory (90c) connected to the CPU (90a) through the M/B (motherboard) chip set (90b), and a display mechanism (90d) also connected to the CPU (90a) through the M/B chip set (90b). The computer further includes a network interface (90f), a non-volatile storage device (90g), a voice mechanism (90h), a keyboard/mouse (90i) and a flexible disk drive (90j). Each of these components is connected to the M/B chip set (90b) through a bridge circuit (90e).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for reproducing a graphical user interface display, the method comprising:
    with a graphical user interface display reproduction system, extracting data from network traffic being sent from a server to a first client device, said network traffic including cacheable files used to create a graphical user interface display on said first client device;
    with said reproduction system, storing said cacheable files in a trace file associated with said first client device;
    with said reproduction system, sending said trace file comprising said cacheable files to a second client device in response to a request from said second client device;
    extracting a response file from the trace file corresponding to the graphical user display on said first user device; and
    with said second client device, displaying on a graphical user interface associated with the second client device said graphical display image using said cacheable files, said graphical display image being displayed as it was displayed on said first client device.

2. The method of claim 1, wherein said request from said second client device is made to said reproduction system in response to intercepting a response packet destined for said first client device, said response packet not including said cacheable files.

3. The method of claim 2, wherein it is known that said response packet does not include said cacheable files due to a cache valid indicator within a header of said response packet.

4. The method of claim 2, wherein it is known whether a file within said response packet is cacheable based on a file type of said cacheable files.

5. The method of claim 1, wherein said trace file includes multiple cacheable files used to create a graphical user interface display on said first client device, each of said multiple cacheable files collected from said network traffic.

6. The method of claim 5, wherein said trace file is further associated with a specific user of said first client device.

7. The method of claim 5, wherein said cacheable files within said trace file are sorted according to a particular point in time that a graphical user interface display was displayed on said first client device.

8. A method for reproducing a graphical user interface display, the method comprising:
    with a graphical user interface display reproduction system, extracting data from network traffic being sent from a server to a first client device, said network traffic including cacheable files used to create a graphical user interface display on said first client device;
    with said reproduction system, storing said cacheable files in a trace file associated with said first client device for a particular user at a particular point in time; and
    with said reproduction system, sending the trace file comprising a plurality of said cacheable files to a second client device for display on said graphical user interface display on said second client device, in response to a request for said trace file from said second client device;
    extracting a response file from the trace file corresponding to the graphical user display on said first client device; and
    displaying the response file on the second client device using the trace file as displayed on the first client device.

9. The method of claim 8, wherein said request from said second client device is made to said reproduction system in response to intercepting the response packet destined for said first client device.

10. The method of claim 9, wherein it is determined that said response packet does not comprise a cacheable file based on a cache valid indicator within a header of said response packet.

11. The method of claim 9, wherein a determination is made as to whether a file within said response packet is cacheable based on a file type of said cacheable files.

12. The method of claim 8, wherein said cacheable files within said trace file are sorted according to a particular point in time that a graphical user interface display was displayed on said first client device.

13. A system for reproducing a graphical user interface, comprising:
- a graphical user interface display reproduction system to:
  - intercept and extract a number of cacheable files from network traffic being sent from a server to a first client device, said cacheable files used to create a graphical user interface display on said first client device;
  - store each of the cacheable files in a trace file according to the user accessing the cacheable files and when the cacheable files were accessed;
  - receive a request from a second client device requesting the trace file;
  - extract a response file from the trace file used to create the graphical user interface display on the first client device;
  - generate a graphical user interface select screen describing selections of a number of the graphical user interface displays represented by each of the cacheable files in the trace file; and
  - transmit the graphical user interface display select screen to a browser operating on the second client device.

14. The system of claim 13, wherein graphical user interface display reproduction system receives from the second client device a selection indicating which graphical user interface display from among the number of the graphical user interface displays that are to be displayed on the second client device.

15. The system of claim 14, wherein the graphical user interface display select screen includes a list of HTML files corresponding to the graphical user interface displays defined by the cacheable files intercepted and extracted from the network traffic.

16. The system of claim 14, wherein the graphical user interface display reproduction system, in response to receiving the selection from the second client device, retrieves the cacheable files associated with the graphical user interface display selected and transmits the cacheable files to the second client device.

17. The system of claim 16, wherein previous to transmitting the cacheable files to the second client device, the graphical user interface display reproduction system determines whether to rewrite the cacheable files based on whether the retrieval of the cacheable files is successful.

18. The system of claim 17, wherein when, when the retrieval of the cacheable files is successful, the graphical user interface display reproduction system rewrites the cacheable files.

19. The system of claim 13, wherein it is known whether a cacheable file among the number of cacheable files exists within said network traffic based on a file type of said network traffic.

20. The system of claim 13, wherein it is known whether a cacheable file among the number of cacheable files exists within said network traffic based on a cache valid indicator within a header of a response packet.

* * * * *